US007228690B2

(12) United States Patent
Barker et al.

(10) Patent No.: US 7,228,690 B2
(45) Date of Patent: Jun. 12, 2007

(54) THERMAL STORAGE APPARATUS

(75) Inventors: Geoffrey Barker, Cheshiro (GB); Adrian Hutchings, South Wirral (GB)

(73) Assignee: Thermetica Limited, Chester (GB)

( * ) Notice: Subject to any disclaimer, the term of this patent is extended or adjusted under 35 U.S.C. 154(b) by 109 days.

(21) Appl. No.: 10/503,671

(22) PCT Filed: Feb. 7, 2003

(86) PCT No.: PCT/GB03/00533

§ 371 (c)(1),
(2), (4) Date: Apr. 29, 2005

(87) PCT Pub. No.: WO03/067168

PCT Pub. Date: Aug. 14, 2003

(65) Prior Publication Data

US 2005/0172659 A1 Aug. 11, 2005

(30) Foreign Application Priority Data

Feb. 9, 2002 (GB) ................................. 0203119.3

(51) Int. Cl.
*F25D 17/02* (2006.01)
(52) U.S. Cl. .......................................... 62/118; 62/340
(58) Field of Classification Search ................ 62/48.1, 62/66, 71, 81, 114, 118, 332, 340, 398, 430, 62/434
See application file for complete search history.

(56) References Cited

U.S. PATENT DOCUMENTS

| 4,821,794 A | * | 4/1989 | Tsai et al. ............... 165/104.17 |
| 4,875,915 A | * | 10/1989 | Rockenfeller .................... 62/4 |
| 5,056,588 A | * | 10/1991 | Carr ............................. 165/10 |
| 5,201,606 A | * | 4/1993 | Davis et al. .................. 405/55 |
| 5,218,826 A | | 6/1993 | Kirschner |
| RE34,542 E | * | 2/1994 | Rockenfeller .......... 165/104.12 |
| 5,363,660 A | * | 11/1994 | Li et al. ......................... 62/71 |
| 5,465,795 A | * | 11/1995 | Galbraith et al. ............. 169/11 |
| 6,560,971 B2 | * | 5/2003 | Takao et al. .................. 62/54.1 |
| 6,915,643 B2 | * | 7/2005 | Fukumoto et al. ............. 62/66 |

FOREIGN PATENT DOCUMENTS

| EP | 1106838 | 6/2001 |
| GB | 2283307 | 5/1995 |
| JP | 7-301475 A | * 11/1995 |

* cited by examiner

*Primary Examiner*—Mohammad M. Ali
(74) *Attorney, Agent, or Firm*—Adams Evans P.A.

(57) ABSTRACT

The thermal storage apparatus contains a heat transfer fluid (102) and a thermal storage medium (101), being immiscible and of differing densities. The thermal storage apparatus comprises a vessel (100) for containing a layer of heat transfer fluid (102) in contact with a layer of thermal storage medium (101), and a charging loop (120) including an inlet nozzle (200) having a mouth The charging loop (120) is arranged to supply cool heat transfer fluid (102) into the vessel (100) directed at least partially into the layer of thermal storage medium (101) and the inlet nozzle (200) is shaped such that heat transfer fluid (102) flowing therethrough operatively draws thermal storage medium (101) into the mouth thereof. The thermal storage apparatus described provides good mixing of cooled heat transfer fluid (102) with thermal storage medium (101), minimal blockages in the charging loop (120) and allows good separation of the heat transfer fluid (102) and thermal storage medium (101).

13 Claims, 4 Drawing Sheets

THERMAL STORAGE APPARATUS

This is a national phase application of International Application PCT/GB03/00533, filed Feb. 7, 2003, and claims priority to United Kingdom Patent Application No. 0203119.3, filed Feb. 9, 2002. The present invention relates in general to a thermal storage apparatus and to a method for use with a thermal storage apparatus.

GB 2 283 307 discloses a known thermal storage apparatus comprising a vessel which in use contains a thermal storage medium such as water, together with a heat transfer fluid such as 1,1,1-trichloroethane. The thermal storage medium and the heat transfer fluid are immiscible and of differing densities, such that they settle by gravity to form distinct layers. The heat transfer fluid is drawn from the vessel so that it may be cooled, and is then re-introduced to the vessel through an inlet nozzle. The cooled heat transfer fluid in turn cools the thermal storage medium. Typically, the water used as the thermal storage medium is cooled to form an ice slurry.

The thermal storage apparatus is discharged by drawing the cooled thermal storage medium (i.e. water and/or ice slurry) from the vessel through a discharge loop, for use by a cooling load such as an air conditioning unit or a container for produce such as fruit or dairy products. Usually, the discharge loop returns spent thermal storage medium to the vessel.

A first problem arises in that it is desired to achieve efficient thermal transfer between the cooled heat transfer fluid and the thermal storage medium. It has been observed that efficient thermal transfer is improved by mixing together of the heat transfer fluid and the thermal storage medium to increase their direct contact. For example, GB 2 283 307 discloses that a small amount of thermal storage medium should be drawn into the charging loop immediately upstream of the inlet nozzle, in order to aid mixing. However, the inlet nozzle tends to become blocked with ice, which initially increases load in the charging loop and eventually renders the apparatus inoperable until the blockage is cleared.

A second problem arises in that, once thermal transfer between the heat transfer fluid and the thermal storage medium has been achieved, it is then desired to efficiently separate the fluids. After taking in heat from the thermal storage medium the heat transfer fluid is drawn from the vessel through an outlet nozzle, and into is the charging loop for cooling. Generally, efficient separation is required in order to prevent the thermal storage medium being drawn from the vessel into the charging loop though the outlet nozzle. Any thermal storage medium (i.e. water) present in the low-temperature charging loop tends to solidify (i.e. form ice), thereby reducing efficiency of the charging loop and/or causing a blockage. The charging loop usually contains a heat exchanger, which is particularly vulnerable to ice blockage.

An aim of the present invention is to provide a thermal storage apparatus that in use allows efficient thermal transfer between a heat transfer fluid and a thermal storage medium. A preferred aim is to provide a thermal storage apparatus that in use allows good mixing of cooled heat transfer fluid with thermal storage medium. Another preferred aim is to minimise blockage in a charging loop, in particular in the region of an inlet nozzle. Another preferred aim is to provide a thermal storage apparatus that in use allows good separation of the heat transfer fluid and the thermal storage medium, in particular to avoid the thermal storage medium being drawn from the vessel into an outlet nozzle of the charging loop.

According to a first aspect of the present invention there is provided a thermal storage apparatus for use with a heat transfer fluid and a thermal storage medium being immiscible and of differing densities, the apparatus comprising: a vessel for in use containing a layer of heat transfer fluid in contact with a layer of thermal storage medium; and a charging loop including an inlet nozzle having a mouth; wherein the charging loop in use supplies cooled heat transfer fluid into the vessel directed at least partially into the layer of thermal storage medium; and wherein the inlet nozzle is shaped such that heat transfer fluid flowing therethrough operatively draws thermal storage medium into the mouth thereof.

Suitably, the mouth of the inlet nozzle is defined by an interior wall. The inlet nozzle is configured to promote flow separation of the heat transfer fluid away from the interior wall defining the mouth of the nozzle. Such flow separation in use causes the thermal storage medium in the vessel to be drawn toward and/or into the mouth of the inlet nozzle. Preferably, the flow separation causes a low-pressure region adjacent the interior wall which, when appropriately configured, causes thermal storage medium in the vessel near the inlet nozzle to be drawn toward the nozzle, and at least partially into the mouth region of the inlet nozzle. Suitably, an area of high turbulence is created at the mouth of the inlet nozzle and/or extending into the vessel. This area of high turbulence results in efficient mixing of the heat transfer fluid with the thermal storage medium, which advantageously allows efficient thermal exchange.

Preferably, the mouth of the inlet nozzle is divergent toward the vessel. Conveniently, the inlet nozzle is generally conical. The inlet nozzle may have any convenient cross-section. In one preferred embodiment the inlet nozzle is a divergent circular conical shell. The inlet nozzle may diverge smoothly at a constant rate, or at a variable rate, and/or may comprise one or more step changes in transverse cross-sectional area.

The inlet nozzle is conveniently formed by pipework coupled to an aperture in the vessel. Additionally or alternatively, the mouth region can be formed by shaping the wall of the vessel that surrounds the aperture.

Advantageously, in addition to promoting enhanced thermal transfer, the region of high turbulence at the mouth of the inlet nozzle also discourages blockages such as the formation of solidified thermal storage medium. However, a heater may be provided adjacent to the inlet nozzle to further discourage formation of solidified thermal storage medium in the region of the inlet nozzle.

Preferably, the charging loop comprises a gas inlet which in use allows a gas to enter the cooled heat transfer fluid. The gas inlet may comprise a pump to drive air into the heat transfer fluid, and/or may comprise a Venturi arranged to draw gas into a flow of heat transfer fluid. Preferably, the gas inlet is provided immediately upstream of the inlet nozzle, and ideally is provided immediately upstream of the turbulent mouth region of the inlet nozzle. The gas is conveniently air, ideally being cooled air drawn from inside the vessel. The injected gas aids mixing of the heat transfer fluid with the thermal storage medium. Also, it has been observed that the gas significantly aids separation. In a preferred embodiment, the thermal storage medium is cooled by the heat transfer fluid to form solidified particles (i.e. ice crystals). The gas forms buoyant bubbles which attach to the solidified particles and aid upward movement of the thermal storage medium. As a result, the thermal storage medium is encouraged to separate away the heat transfer fluid which falls to form a lower and denser layer of heat transfer fluid.

In the preferred embodiment, a transducer is provided in an upper region of the vessel, arranged to receive an upward pressure as solidified thermal storage medium is formed and rises to an upper portion of the thermal storage medium layer. The transducer conveniently provides an output representing a thermal state of the apparatus, e.g. during charging or discharging, by measuring upward force applied by the floating solidified thermal storage medium.

According to a second aspect of the present invention there is provided an inlet nozzle for use in a thermal storage apparatus having a charging loop coupled to a vessel, in use containing a layer of heat transfer fluid in contact with a layer of thermal storage medium wherein the heat transfer fluid and the thermal storage medium are immiscible and of differing densities, the inlet nozzle comprising a mouth coupleable to the vessel to supply cooled heat transfer fluid into the vessel directed at least partially into the layer of thermal storage medium wherein the inlet nozzle is shaped such that heat transfer fluid flowing through the inlet nozzle operatively draws thermal storage medium into the mouth of the inlet nozzle.

According to a third aspect of the present invention there is provided a vessel for use in a thermal storage apparatus having a charging loop including an inlet nozzle having a mouth, the vessel comprising: a wall coupleable to the inlet nozzle, the wall being shaped such that in use heat transfer fluid flowing through the inlet nozzle operatively draws thermal storage medium into a mouth interface region of the wall and the inlet nozzle.

According to a fourth aspect of the present invention, there is provided a method for charging a thermal storage apparatus having a vessel containing a layer bf a heat transfer fluid and a layer of thermal storage medium being immiscible and of differing densities, and a charging loop including an inlet nozzle having a mouth, the method comprising: supplying cooled heat transfer fluid into the vessel through the inlet nozzle at least partially directed toward the layer of thermal storage medium, the inlet nozzle being shaped such that heat transfer fluid flowing therethrough operatively draws thermal storage medium into the mouth thereof.

For a better understanding of the invention, and to show how embodiments of the same may be carried into effect, reference will now be made, by way of example, to the accompanying diagrammatic drawings in which.

Figure 1:
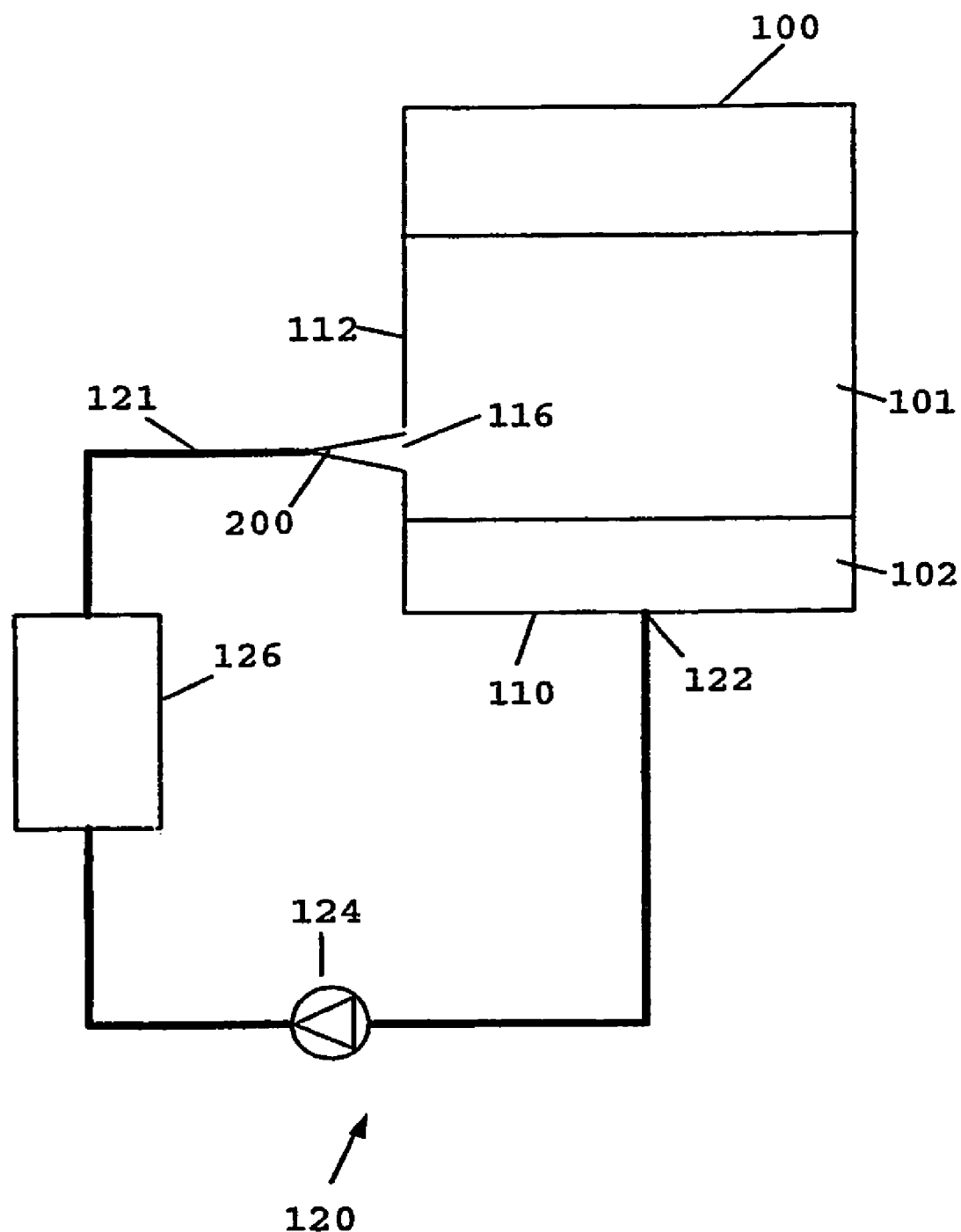
FIG. 1 shows a first preferred embodiment of a thermal storage apparatus.

FIG. 1 shows a thermal storage apparatus comprising a vessel 100 and an inlet nozzle 200. Within the vessel 100 are contained a layer of thermal storage medium 101 and a layer of heat transfer fluid 102. The thermal storage medium 101 and the heat transfer fluid 102 are immiscible and of differing densities such that the heat transfer fluid 102 settles under gravity in the lower portion of the vessel 100 with a layer of thermal storage medium 101 floating above it. The vessel 100 comprises a lower wall 110, and a side wall 112 having an aperture 116 directed toward the layer of thermal storage medium 101 within the vessel 100. The lower wall 110 also includes an aperture defined therein to form an outlet 122.

Also shown in FIG. 1 is a charging loop 120 including a pipe 121, the outlet 122, a pump 124, a heat exchanger 126 and the nozzle 200.

Figure 2:
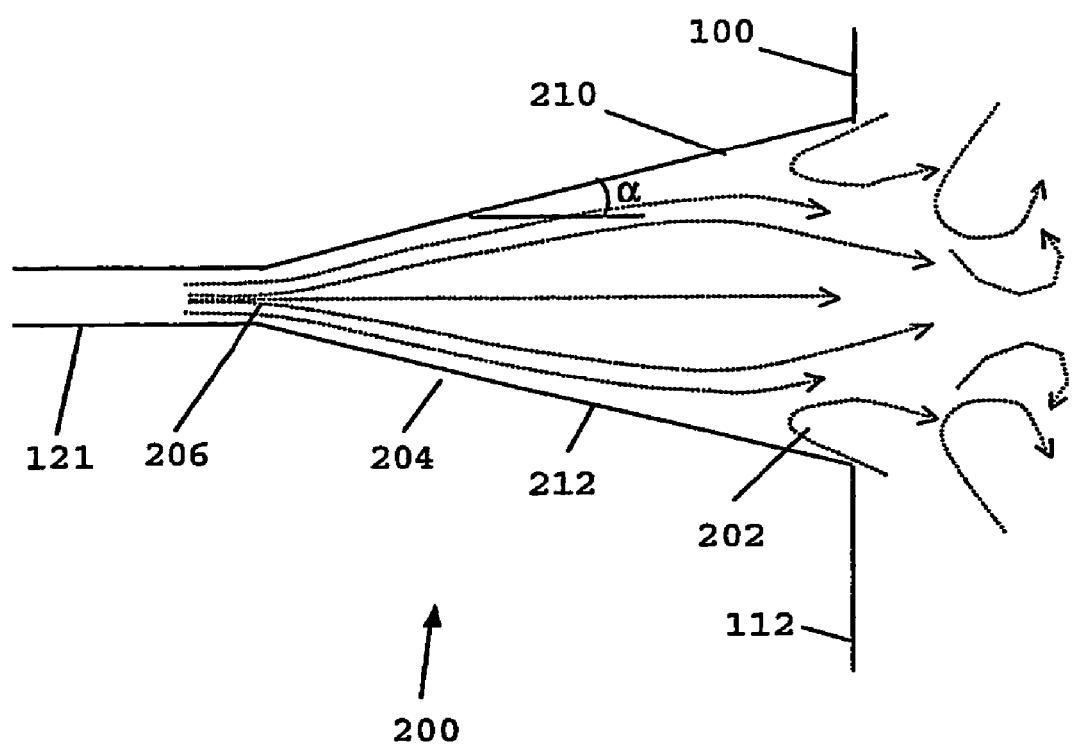
FIG. 2 shows a view of an inlet nozzle.

FIG. 2 shows the inlet nozzle 200 in more detail, comprising a divergent section 204 leading to a mouth 202. The inlet nozzle is coupled to the vessel such that the mouth 202 communicates with the aperture 116 in the side wall 112. Also shown in FIG. 2 are an interior surface 210 and an exterior surface 212 of the inlet nozzle 200.

Referring to FIGS. 1 and 2, in use the pump 124 draws heat transfer fluid 102 from the vessel 100 through the outlet 122 and supplies the heat transfer fluid 102 to the heat exchanger 126. The heat exchanger 126 is used to cool the heat transfer fluid 102 passing through it. The cooled heat transfer fluid 102 is then supplied to the inlet nozzle 200 along the pipe 121 before returning through the aperture 116 to the vessel 100.

The level of the aperture 116 relative to the layers of thermal storage medium 101 and heat transfer fluid 102 ensures that the cooled heat transfer fluid 102 re-enters the vessel 100 within the layer of thermal storage medium 101.

The inlet nozzle 200 promotes mixing of the cooled heat transfer fluid 102 with the thermal storage medium 101 and effective heat transfer between them occurs as they come into direct contact.

The diverging section 204 of the inlet nozzle 200 is shaped such that heat transfer fluid 102 flowing through the diverging section 204 and draws thermal storage medium 101 from the vessel 100 toward the mouth region 202 of the nozzle 200.

The diverging section 204 is a simple circular conical shell. The angle $\alpha$ (as shown in FIG. 2) therefore defines the divergence of the diverging section 204. The angle $\alpha$ is chosen to promote separation of flow of heat transfer fluid 102 from the interior surface 210 of the inlet nozzle 200 near to the mouth. Flow separation will depend on a number of factors such as roughness of the interior surface 210 of the inlet nozzle 200, flow conditions, flow velocity, etc., as will be familiar to the skilled person.

The static pressure within the layer of thermal storage medium 101 contained within the vessel 100 is greater than the pressure in the mouth region 202 adjacent is to the interior surface 210 of the inlet nozzle 200 where flow separation has occurred. Thermal storage medium 101 is therefore drawn toward and into this region. The movement of the thermal storage medium 101 toward the discharging heat transfer fluid 102 caused by the above described pressure difference promotes large scale turbulent mixing of the thermal storage medium 101 and the heat transfer fluid 101. As the thermal storage apparatus operates, the temperature of the layer of thermal storage medium 101 contained within the vessel 100 decreases. The cooled thermal storage medium 101 can later be extracted from the vessel 100 and used to cool a cooling load.

Figure 3:
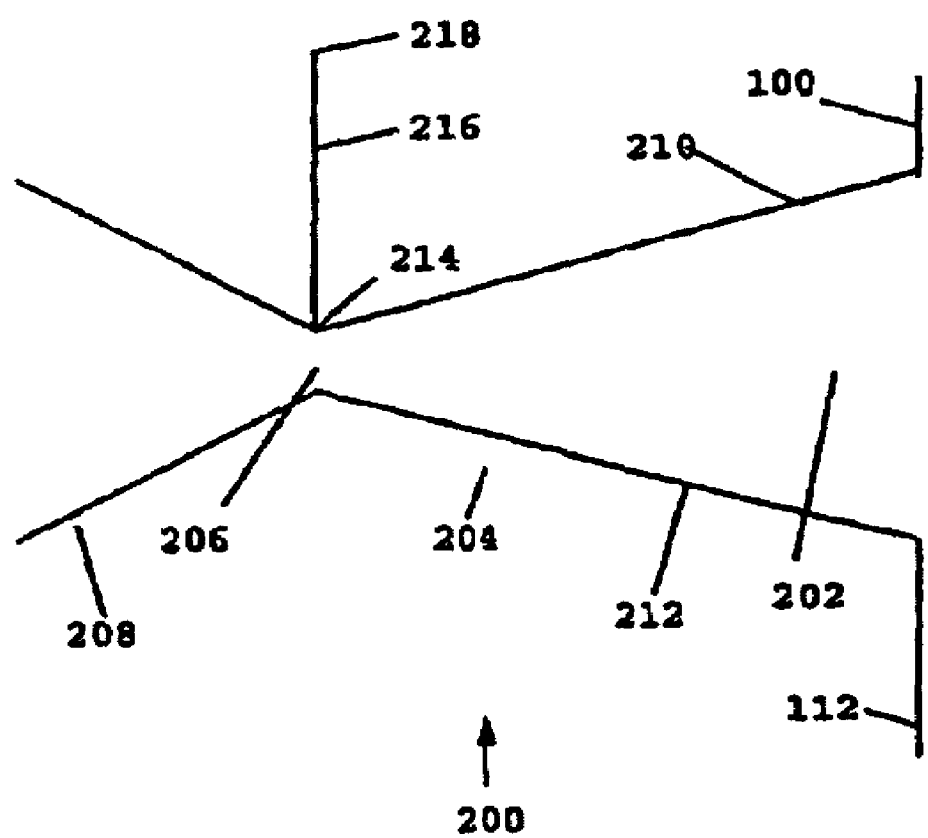
FIG. 3 shows a view of a second preferred inlet nozzle.

FIG. 3 shows a second preferred embodiment of the inlet nozzle 200, which includes a gas inlet 214 to supply gas to the inlet nozzle 200 from a gas supply pipe 216. Conveniently, the nozzle 200 comprises a convergent section 208 leading to a divergent section 204, which form a Venturi arrangement to draw gas from the gas inlet 214. Alternatively, a pump is provided to force gas along the gas supply pipe 216. In this example the sections 208 and 204 are smoothly converging and diverging, respectively, but a similar effect is achievable with stepped changes. A free end 218 of the gas supply pipe 216 may be open to atmosphere, or advantageously is arranged to draw relatively cool atmospheric air from an upper portion of the vessel 100. Most conveniently, the air is introduced to the heat transfer fluid 102 at a throat 206 to aid turbulent mixing of the heat transfer fluid and the thermal storage medium 101.

In the preferred embodiments of the invention water is used as the thermal storage medium 101 and ice is produced as the solidified form of the thermal storage medium 101. Water is a particularly suitable thermal storage medium 101 as it has a liquid phase of greater density then that of the solid phase. This means that if the water 101 is cooled sufficiently to solidify the resulting ice will float above the layer of water 101 within the vessel 100. For this reason ice or ice slurry is more easily separable from the heat transfer fluid 102. Furthermore the ice/water system is also particularly suitable for cold storage due to its large enthalpy of melting and the fact that the melting temperature of ice is suitable for many common cooling applications.

When water is used as the thermal storage medium 101 suitable materials for the heat transfer fluid 102 include 1,1,1-trichloroethane, 1,1,2-trichloroethylene, and perfluorohexane. Another example is hydrofluoroethers, which have the advantage of being environmentally benign.

Figure 4:
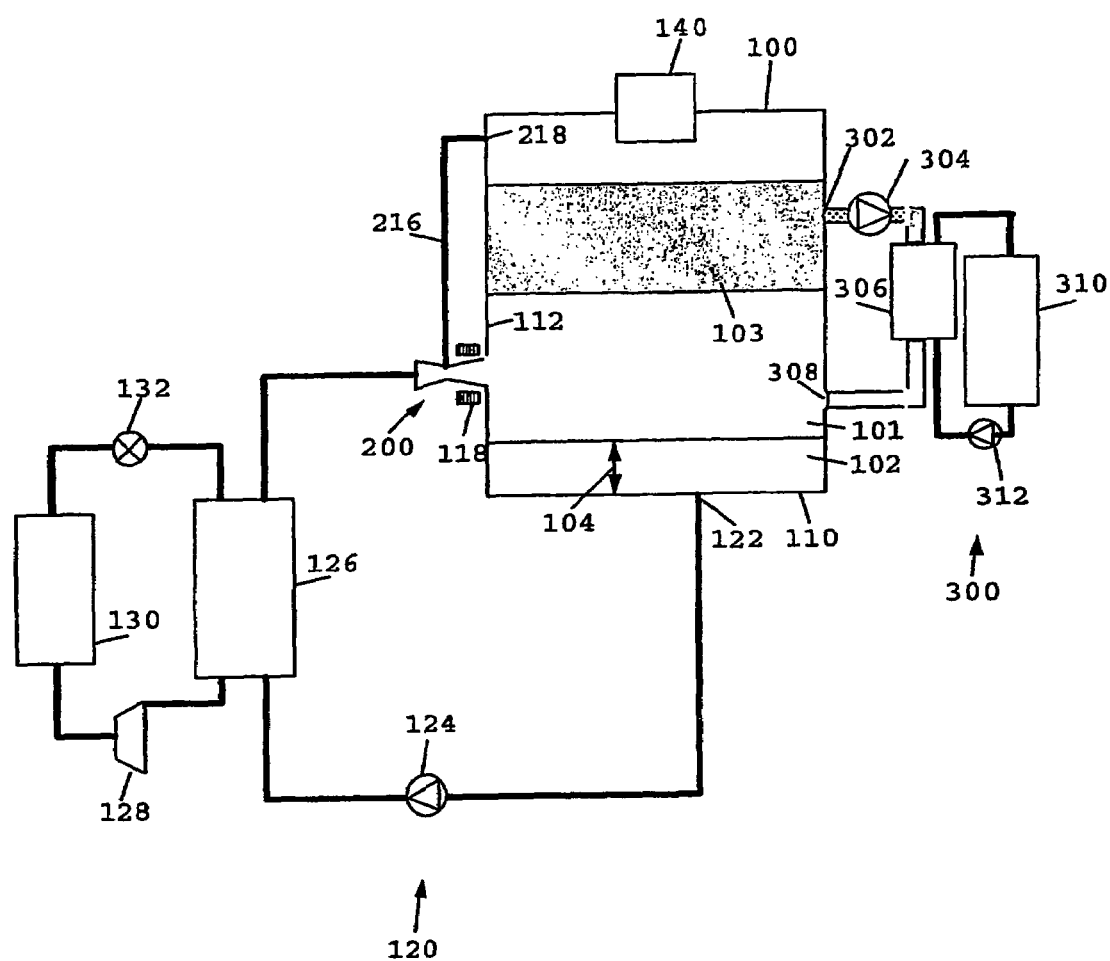
FIG. 4 shows a second preferred embodiment of a thermal storage apparatus.

FIG. 4 shows a preferred thermal storage apparatus using water as the thermal storage medium. Here, the heat transfer fluid 102 is cooled sufficiently such that ice crystals are produced in the water 101. The ice crystals float toward the surface of water 101 and form a layer of ice slurry 103. The introduction of air into the flow of heat transfer fluid 102 aids the separation of ice crystals from the heat transfer fluid 102. As ice crystals form, the bubbles of air attach to the ice crystals and increase buoyancy.

In the arrangement of FIG. 4, the gas supply pipe 216 has open end 218 located within the vessel 100. The air from within the vessel 100 is relatively cold and using this air increases efficiency compared to using relatively hot air from elsewhere. The Venturi arrangement of the inlet nozzle 200 can eliminate the need for a separate air compressor, because pump 124 supplies the necessary energy.

Advantageously, water 101 drawn into the mouth region 202 of the inlet nozzle 200 has a temperature above freezing, which helps to discourage ice formation. A heater 118 optionally supplies heat to the exterior surface 212 of the inlet nozzle 200, to maintain the interior surface 210 above freezing. The heater 118 may have a fixed heat output. Alternatively, the heat output of the heater 118 may vary with the temperature of the interior surface 210 of the inlet nozzle 200, with the temperature of the water 101 within the vessel 100, with the length of time after the thermal storage apparatus is switched on, or with any other suitable variable.

In addition to the inlet nozzle 200 described, other smooth shaped divergent nozzles or step divergences will promote flow separation and turbulence. The inlet nozzle 200 may be a discrete component and may simply form a portion of the pipework of the heat transfer fluid circulating system 120. Alternatively, the inlet nozzle 200 may form part of the side wall 112 of the vessel 100.

Optionally, a transducer 140 is located in an upper portion of the vessel 100, responsive to an upward force applied floating solidified thermal storage medium (i.e. ice). The transducer 140 can be calibrated to output an indication of the quantity of heat energy that is stored in the thermal storage apparatus by measuring the force applied to the upper wall 114 of the vessel 100 by the ice 103, since this force will vary as the quantity of ice 103 stored increases beyond a minimum threshold. The variation in the force recorded by the transducer 140 as the quantity of ice 103 stored increases beyond a minimum threshold is due to the increased buoyancy force from the mass of ice 103 and also on the degree of compactedness of the ice 103.

In FIG. 4, a discharge loop 300 is shown comprising Man ice slurry outlet 302, an ice slurry pump 304, a heat exchanger 306 and a water return inlet 308. In use, a cooling load 310 is coupled to the heat exchanger 306. The pump 312 circulates fluid from the cooling load 310 to the heat exchanger 306 where it is cooled, and returns the cooled fluid to the cooling load 310.

FIG. 4 also shows a refrigeration circuit of the charging loop 120, comprising a compressor 128, a condenser 130 and an expansion device 132. The refrigeration circuit provides cooling for the heat exchanger 126 of the heat transfer fluid circulating system 120.

It should be noted that in this system a significant depth 104 of heat transfer fluid 102 is required within the vessel 100 to ensure that no water 101 is drawn out of the vessel 100 and into the heat transfer fluid circulating system 120. If water were to enter the heat exchanger 126 then ice would form leading to blockages.

A thermal storage apparatus has been described in which a shaped inlet nozzle 200 for introducing cooled heat transfer fluid 102 into a layer of thermal storage medium 101 contained within a vessel promotes effective mixing of the cooled heat transfer fluid 102 and the thermal storage medium 101. In addition, gas bubbles introduced into the cooled heat transfer fluid 102 further promote mixing and, in preferred embodiments, aid separation of the thermal storage medium 101 from the heat transfer fluid 102.

The invention claimed is:

1. A thermal storage apparatus for use with a heat transfer fluid and a thermal storage medium being immiscible and of differing densities, the apparatus comprising:
    (a) a vessel for in use containing a layer of heat transfer fluid in contact with a layer of thermal storage medium; and
    (b) a charging loop including an inlet nozzle having a mouth;
    (c) wherein the charging loop in use supplies cooled heat transfer fluid into the vessel directed at least partially into the layer of thermal storage medium; and
    (d) wherein the inlet nozzle is shaped such that heat transfer fluid flowing therethrough operatively draws the thermal storage medium into the mouth thereof.

2. A thermal storage apparatus according to claim 1, wherein the inlet nozzle is divergent towards the vessel.

3. A thermal storage apparatus according to claim 2 wherein the inlet nozzle is substantially cone shaped.

4. A thermal storage apparatus as claimed in claim 2 or 3, wherein the inlet nozzle comprises one or more step changes in transverse cross-sectional area.

5. A thermal storage apparatus according to claim 1, wherein the inlet nozzle defines a shape adapted to promote flow separation of the heat transfer fluid away from an interior wall of the nozzle.

6. A thermal storage apparatus according to claim 1, wherein the charging loop, in use, is adapted to supply cooled heat transfer fluid into the vessel and further wherein the cooled heat transfer fluid is directed wholly into the layer of thermal storage medium.

7. A thermal storage apparatus according to claim 1, wherein the charging loop includes a gas inlet that, in use, allows a gas to enter the cooled heat transfer fluid.

8. A thermal storage apparatus according to claim 7, wherein the gas inlet is positioned immediately upstream of the mouth of the inlet nozzle.

9. A thermal storage apparatus according to claim 7 or 8, wherein the gas inlet is positioned at a Venturi adapted to draw gas into a flow of heat transfer fluid.

10. A thermal storage apparatus according to claim 1, wherein a transducer is provided in an upper region of the vessel, and wherein the transducer is adapted and positioned to receive an upward pressure as solidified thermal storage medium is formed and rises to an upper portion of the thermal storage medium layer.

11. A thermal storage apparatus according to claim 10, wherein the transducer provides an output representing a thermal state of the thermal storage apparatus.

12. An inlet nozzle for use in a thermal storage apparatus having a charging loop coupled to a vessel, in use, containing a layer of heat transfer fluid in contact with a layer of thermal storage medium wherein the heat transfer fluid and the thermal storage medium are immiscible and of differing densities, the inlet nozzle comprising:
  a mouth adapted for being coupled to the vessel to supply cooled heat transfer fluid into the vessel and to direct at least part of the cooled heat transfer fluid into the layer of thermal storage medium wherein the inlet nozzle comprises one or more step changes in transverse cross-sectional area and is shaped such that heat transfer fluid flowing through inlet the nozzle operatively draws thermal storage medium into the mouth of the inlet nozzle.

13. A method for charging a thermal storage apparatus comprising:
  (a) providing a vessel containing a layer of a heat transfer fluid and a layer of thermal storage medium being immiscible and of differing densities, and a charging loop including an inlet nozzle having a mouth;
  (b) supplying cooled heat transfer fluid into the vessel through the inlet nozzle; and
  (c) at least partially directing the cooled heat transfer fluid toward the layer of thermal storage medium, the inlet nozzle being shaped such that heat transfer fluid flowing therethrough operatively draws thermal storage medium into the mouth thereof.

* * * * *